UNITED STATES PATENT OFFICE.

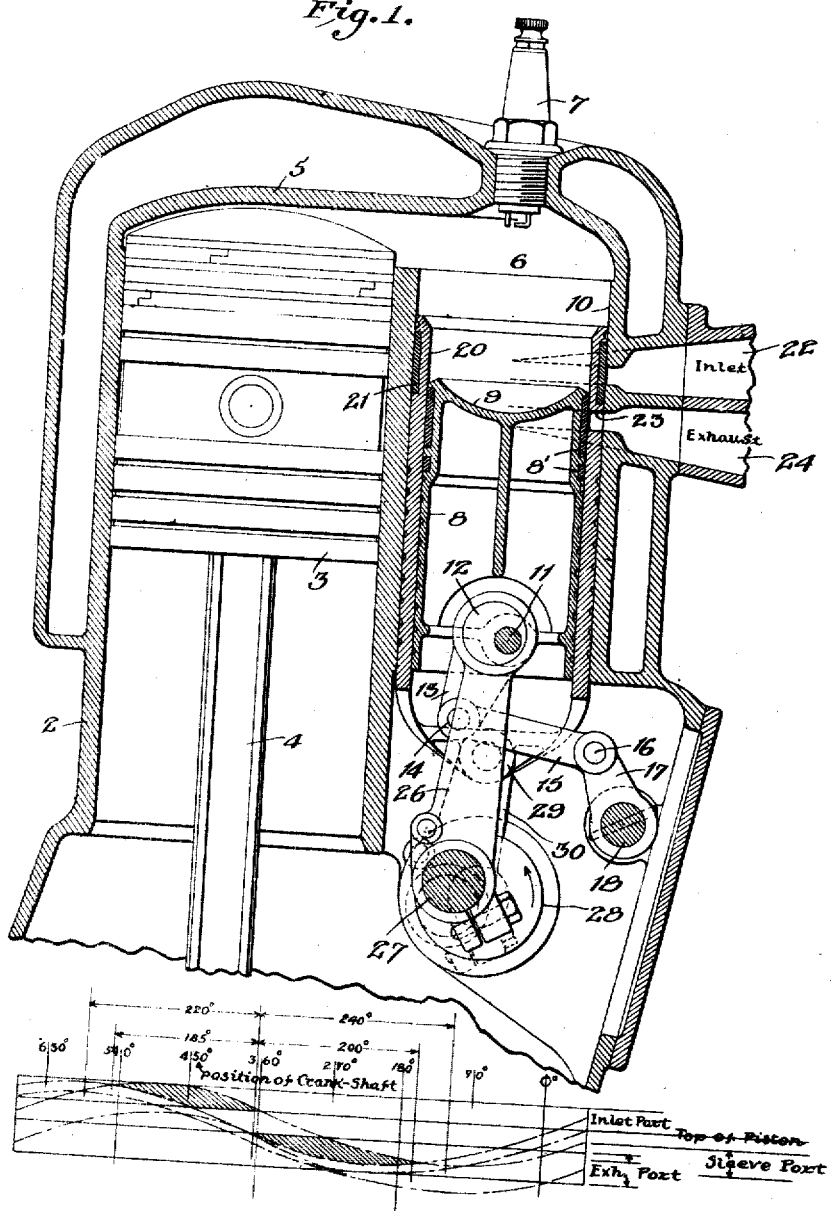

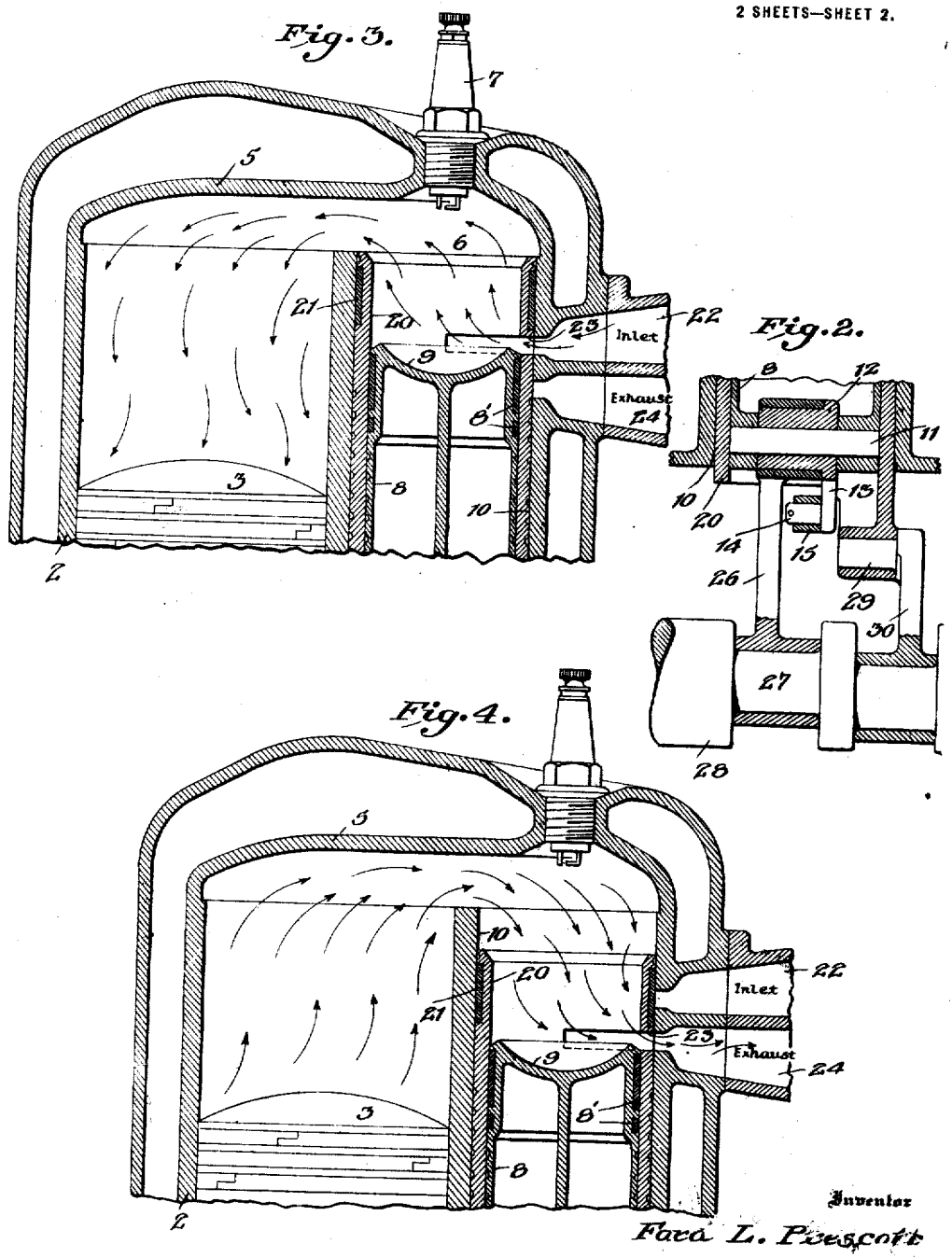

FORD L. PRESCOTT, OF ELMIRA, NEW YORK.

VARIABLE-CUT-OFF VALVE MECHANISM.

1,266,046.    Specification of Letters Patent.    Patented May 14, 1918.

Application filed July 24, 1917. Serial No. 182,5'

*To all whom it may concern:*

Be it known that I, FORD L. PRESCOTT, a citizen of the United States, residing at Elmira, in the county of Chemung and State of New York, have invented certain new and useful Improvements in Variable-Cut-Off Valve Mechanism; and I do hereby declare the following to be a full, clear, and exact description of the invention, such as will enable others skilled in the art to which it appertains to make and use the same.

This invention relates to engines and more particularly to the valve mechanism thereof. It is one of the objects of the present invention to improve the design of the construction of the combustion chamber of internal combustion motors to facilitate the ignition of a charge of fuel therein. To that end the details of the present invention reside in the improvements in design and location of the combustion or sparking chamber of a motor whereby the fuel to be ignited is concentrated in a space immediately about the spark plug and whereby the spreading of the fuel to be ignited throughout the engine head is eliminated. The advantage of this feature of the invention is that the ignited fuel is more perfectly and rapidly burned with a material economy in the consumption of the amount of fuel required in the operation of the engine. Another object of the invention is to improve the valve gear thereof for the purpose of more effectually controlling the length of the period during which the intake and exhaust passageways from the combustion chamber are opened, and it is also in this respect, an object of the invention to improve the construction of the valve members so that they may be made of relatively small size when compared to the size of a given motor, and which also permits of the integral construction of the cylinder and cylinder head thereby eliminating separable parts and avoiding the formation of joints and also doing away with the usual means employed to fasten separable parts when the engine body comprises a separate cylinder and head for each unit of its motor. A further and important object of the present invention is the provision of a valve gear which is readily adjustable to vary the period of the opening of the intake and exhaust ports so as to make the engine operable more efficiently under varying loads and varying speeds, and further, it is an object of the present invention to provide a valve structure of such type whereby it may be utilized as an element deriving power from the exploded gases in the combustion chamber to help or assist in the driving of the crank shaft of the motor and thereby improve the operation of the engine in such manner that there is a nearly constant torque throughout the operation of the engine over a wide variation in the speed range and with a resultant efficiency in consumption of fuel at high and low speed. To that end one feature of my present invention resides in the formation of a valve gear including relatively slidable members one of which may be designed as a piston for utilizing power derived from the force of exploding gases to assist in the driving of the crank shaft of the motor and includes means for relatively adjusting the valve members so as to control the length of period of the opening of the exhaust and inlet ports of the engine casing.

With the above and other objects in view as will be rendered manifest in the following specification and which will be readily apparent to those skilled in the art, my invention consists in the construction, combination and arrangement of the parts as described in the following specification and illustrated in the accompanying drawings, wherein one embodiment of the invention is disclosed.

In the drawings:

Figure 1 is a central transverse section through a portion of the motor cylinder and the improved valve gear;

Fig. 2 is a detail sectional view of the valve operating mechanism;

Fig. 3 is a detail sectional view of the upper portion of the cylinder showing the valve in the intake position;

Fig. 4 is a similar view showing the valve in the exhaust position; and

Fig. 5 is a diagrammatic view of the variable valve action.

It is well known that in all types of internal combustion engines in which the period of opening of the several ports remains constant throughout the operation of the engine, independently of the load the engine has to carry and independently also of the various rates of speed with which the engine is called upon to operate, that there is a material loss of power because of this constancy of the open period of the ports and a serious loss of fuel for the same reason. While my present invention has in view several objects for the purpose of increasing the power derived from the fuel during the running of the engine and for the purpose also of simplifying the construction of the engine and thereby reducing the cost of the manufacture of the several parts thereof, one of the more important objects of my present invention is to provide means whereby the period of opening of the intake and exhaust ports may be varied as found requisite by conditions occurring in the operation of motors of this character. While the broad idea of varying the period of opening of the inlet and exhaust ports may be incorporated in several forms of valves and valve gears, I have elected in the present instance to disclose such a valve gear as comprising relatively slidable parts, each operated by a suitable mechanism, these being provided for the relative adjustments of the positions of the parts of the valve to one another to secure the desired period of opening during the various operating conditions of the motor.

Therefore, I have shown the invention as incorporated in an engine one cylinder of which is indicated at 2 within which there is operable a piston 3, provided with a connecting rod 4 for connection to the usual crank shaft in any suitable and well known manner. As one object of my invention is to improve the method of producing combustion of the fuel vapors in the combustion chamber, I have shown the upper end of the piston 3 as rounded and when this latter is in the upper position as shown it comes close to the head 5 of the cylinder so as to displace gases therein and cause the compression of the gases in one stroke of the piston 3 in a substantially spherical chamber 6 shown as eccentrically located with relation to the chamber of the cylinder 2, and provided with a spark plug 7.

The valve gear hereinbefore referred to comprises a piston 8 having a concaved head 9 forming one side of the combustion chamber 6, the piston operating in a chamber 10 formed lateral to and parallel with the cylinder 2, and provided at its lower end with a wrist pin 11 which is mounted in an eccentric 12, this latter having a downwardly extending arm 13 connected at 14 to a link 15 which in turn is connected at 16 to the upper end of a crank arm 17 fastened on a rock shaft 18 suitably journaled in the casing of the engine. Interposed between the piston 8 and the bore of the cylinder 10 there is provided a sleeve valve 20 of somewhat greater length than the piston 8 and having at its upper end an exterior wide packing member 21 so disposed that when in its lowermost position it will cover an inlet port 22 formed in the upper portion of the valve cylinder 10. The sleeve valve 20 is also provided at a point just below the band 21 with an annular port 23 of suitable length and width adapted to open when in its lowermost position with the exhaust port 24. Obviously the piston 8 is provided with exterior packing rings 8' the upper of which is adapted to overlap the exhaust port 23 of the valve sleeve 20 when the parts are in the position shown in Fig. 1. To impart relative sliding movement to the valve piston and the valve sleeve as to the casing of the engine, the piston 8 is connected by means of a connecting rod 26 to an eccentric portion 27 of a one-half speed shaft 28 suitably geared to the crank shaft of the motor, the upper end of the connecting rod 26 bearing upon the eccentric bushing 12 above referred to as mounted on the wrist pin 11, and the valve sleeve 20 is connected at 29 Fig. 2 to a link 30 connected at its lower end to an eccentric portion 31 of the valve shaft 28. The relative angular position of the eccentric portions 27 and 31 of the crank shaft 28 is such that the piston 8 is moved relative to the valve sleeve 20 to open the port 23 of the valve sleeve when the latter is in such position that its port registers with the inlet or the exhaust port of the motor casing clearly shown in Figs. 3 and 4, while when the sleeve valve 20 is in the position shown in Fig. 1 and the parts are moving downwardly together, the piston 8 covers the port 23 of the piston sleeve 20.

As shown in the diagrammatic view, Fig. 5, it will be seen, by the full line position of the top of the piston and the sleeve port when the valve members are set in one position with respect to the crank shaft, angular positions of which are designated by the numerals beginning 0 (zero) extending to 630°, that the exhaust port may be maintained in an open position for a period of 110 240° while the inlet port may be maintained in open position for a following period of 220°. This period of opening of the respective ports is satisfactory and efficient while the engine is operating at high speed where the inertia of the fuel and exhaust gases has a tendency to aid a power piston during the suction and the eduction strokes, but at low speed the velocity of the gas is much less and this condition of the timing of the valve is inefficient because of a tendency of a return surge of the gases before the valve is closed. This results in a loss of power and an extravagant consumption of fuel as a portion of the fuel charge is caused to be thrown back through the carbureter. From this it will be seen that by my arrangement of valve and through the provision of the rock shaft the piston valve can be moved relatively to the sleeve valve 20 as shown by the dotted line in Fig. 5 so as to materially reduce the period of opening of the intake as shown in the diagram to an extent of 200° for the exhaust and 185° for the inlet which is suitable for the operation of the engine at low speed. While I prefer to turn the valve shaft 28 in the direction of the arrow in Fig. 1 so that the advantage of the pressure of the expanding gases on the piston 8 is utilized to assist the crank shaft, it is understood of course, that the valve shaft may operate in either direction as may be desired.

It is further understood that in cases where the speeds and loads do not vary greatly, the variable feature may be omitted, in which case all the other parts would be substantially as shown, but in which the duration of inlet and exhaust periods would remain constant.

What is claimed as new is:—

1. In an internal combustion engine, a cylinder and its piston, a lateral explosion chamber having adjacent inlet and outlet ports for the cylinder, a sleeve valve interposed between said ports and the cylinder and having a port coördinate with said ports; a piston valve operatively fitting the sleeve valve for controlling flow through the valve port, a crank shaft connected to said valve and means for adjusting the piston valve independently of the sleeve valve.

2. In an internal combustion engine, a casing having a piston cylinder and a combustion chamber disposed laterally thereto and having axially alined and adjacent inlet and outlet ports, a sleeve valve having a port alternately registrable with said ports, a piston valve in said sleeve to cover the port thereof, a crank shaft with a crank for each valve member, a connecting pitman for the piston valve and its crank, and an adjustable connection between said pitman and the valve whereby the operating cycle of the piston is variable as to the sleeve.

3. In an internal combustion engine, a valve organization including a piston valve coacting with the usual piston of the motor to impart power from the combustion chamber to the crank shaft and a sleeve valve embracing about the piston valve, and means for operating said valves whereby the exhaust is opened at the lower limit of movement of the piston valve whereby the lower half of the downstroke of the piston valve is utilized to transmit power to the main shaft of the engine.

4. In an internal combustion engine, a casing having a piston cylinder and respectively upper and lower intake and outlet ports, and a valve organization operative to vary the opened and closed periods of the ports to the cylinder and including a ported sleeve and a piston therein uncovering the exhaust and sleeve port when in its lowermost position.

5. In an internal combustion engine having a casing with a piston cylinder with a lateral combustion chamber having intake and outlet ports, a valve organization in said chamber comprising relatively adjustable, coöperative concentric piston and sleeve valve members controlling flow at said ports, said sleeve having a circumferential port registrable with said ports, said piston operative to cover and uncover the port.

6. In an internal combustion engine a casing with a main piston cylinder and intake and outlet ports therefor, a valve organization comprising relatively adjustable, coöperative concentric piston and sleeve valve members controlling flow at said ports, and means for relatively adjusting said piston at will to vary the open periods of both the inlet and exhaust ports.

7. In an internal combustion engine a casing with a piston cylinder having a lateral combustion chamber with intake and outlet ports, a valve organization in said chamber comprising relatively adjustable, coöperative concentric piston and sleeve valve members controlling flow at said ports, means for relatively adjusting said members at will, and means for actuating said members independently of the adjusting means.

In testimony whereof I affix my signature.

FORD L. PRESCOTT.